US012572667B2

(12) United States Patent
Zhang

(10) Patent No.: US 12,572,667 B2
(45) Date of Patent: Mar. 10, 2026

(54) ENCRYPTION METHOD AND APPARATUS, ELECTRONIC DEVICE, AND MEDIUM

(71) Applicant: VIVO MOBILE COMMUNICATION CO., LTD., Dongguan (CN)

(72) Inventor: Bo Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 184 days.

(21) Appl. No.: 18/226,430

(22) Filed: Jul. 26, 2023

(65) Prior Publication Data

US 2023/0385426 A1 Nov. 30, 2023

Related U.S. Application Data

(63) Continuation of application No. PCT/CN2022/074041, filed on Jan. 26, 2022.

(30) Foreign Application Priority Data

Jan. 27, 2021 (CN) .......................... 202110112722.6

(51) Int. Cl.
*G06F 21/60* (2013.01)

(52) U.S. Cl.
CPC .................................. *G06F 21/602* (2013.01)

(58) Field of Classification Search
CPC .... G06F 21/602; G06F 3/0482; G06F 3/0488; G06F 3/04883; G06F 3/04886; G06F 3/0484; G06F 3/0487; G06F 2221/2107
See application file for complete search history.

(56) References Cited

U.S. PATENT DOCUMENTS

| | | | | |
|---|---|---|---|---|
| 9,165,128 | B1 | 10/2015 | Daniel | |
| 2008/0250242 | A1* | 10/2008 | Bhogal | ............... H04L 63/0428 |
| | | | | 713/167 |
| 2013/0246813 | A1* | 9/2013 | Mori | ...................... H04L 9/008 |
| | | | | 713/193 |

FOREIGN PATENT DOCUMENTS

| | | |
|---|---|---|
| CN | 104700001 A | 6/2015 |
| CN | 105808238 A | 7/2016 |
| CN | 106203061 A | 12/2016 |
| CN | 106203176 A | 12/2016 |
| CN | 106599723 A | 4/2017 |
| CN | 107103247 A | 8/2017 |
| CN | 108491133 A | 9/2018 |
| CN | 108509105 A | 9/2018 |
| CN | 109886047 A | 6/2019 |
| CN | 110457879 A | 11/2019 |
| CN | 111371773 A | 7/2020 |
| CN | 111428223 A | 7/2020 |

(Continued)

*Primary Examiner* — Sangseok Park
(74) *Attorney, Agent, or Firm* — The Webb Law Firm

(57) ABSTRACT

An encryption method includes receiving a first input by a user; displaying N encryption controls in response to the first input, where each of the N encryption controls corresponds to an encryption manner; receiving a second input by the user for a target object currently displayed on the electronic device and a first encryption control of the N encryption controls; and processing, in a case that a first encryption manner matches the target object, the target object in the first encryption manner in response to the second input. The first encryption manner is an encryption manner corresponding to the first encryption control.

17 Claims, 12 Drawing Sheets

An electronic device receives a first input by a user ⟩201

The electronic device displays N encryption controls in response to the first input ⟩202

The electronic device receives a second input from the user for a target object currently displayed on the electronic device and a first encryption control of the N encryption controls ⟩203

The electronic device processes the target object in the first encryption manner in response to the second input when the first encryption manner matches the target object ⟩204

(56) References Cited

FOREIGN PATENT DOCUMENTS

| CN | 112948843 | A | 6/2021 |
| NO | 2015081777 | A1 | 6/2015 |

* cited by examiner

54

Input privacy password

55

600

ENCRYPTION METHOD AND APPARATUS, ELECTRONIC DEVICE, AND MEDIUM

CROSS-REFERENCE TO RELATED APPLICATIONS

This application is a Bypass Continuation Application of International Patent Application No. PCT/CN2022/074041 filed Jan. 26, 2022, and claims priority to Chinese Patent Application No. 202110112722.6 filed Jan. 27, 2021, the disclosures of which are hereby incorporated by reference in their entireties.

BACKGROUND OF THE INVENTION

Field of the Invention

This application belongs to the technical field of information encryption, and specifically relates to an encryption method and apparatus, an electronic device, and a medium.

Description of Related Art

Currently, when a user wants to allow other users to browse a content in an electronic device, but does not want them to browse other contents in the electronic device, such as content in an application program, the user can trigger the electronic device to encrypt the application program. For example, the user can select an identifier of an application program in an "app lock" function of the "settings" application program of the electronic device, thereby triggering the electronic device to encrypt the application program, so that other users cannot view contents of the application program.

However, in the above method, due to the deep setting level of the existing encryption manner, when the user wants to encrypt an application program, the user has to input level by level to trigger the electronic device to encrypt the application program. Besides, since the existing encryption manner only encrypts the application program, it may not be able to encrypt a specific content in the application program. In this way, steps of encryption in the electronic device are cumbersome, and the encryption manner is relatively rigid and inflexible.

SUMMARY OF THE INVENTION

Embodiments of this application are provide an encryption method and apparatus, an electronic device, and a medium.

In a first aspect, the embodiments of this application provide an encryption method, and the method includes: receiving a first input by a user; displaying N encryption controls in response to the first input, where each of the N encryption controls corresponds to an encryption manner; receiving a second input by the user for a target object currently displayed on the electronic device and a first encryption control of the N encryption controls; and processing, in a case that the first encryption manner matches the target object, the target object in the first encryption manner in response to the second input, where the first encryption manner is an encryption manner corresponding to the first encryption control.

In a second aspect, the embodiments of this application provide an encryption apparatus, and the encryption apparatus includes a receiving module, a display module, and a processing module. The receiving module is configured to receive a first input by a user; the display module is configured to display N encryption controls in response to the first input, where each of the N encryption controls corresponds to an encryption manner; the receiving module is further configured to receive a second input by the user for a target object currently displayed on the electronic device and a first encryption control of the N encryption controls; and the processing module is configured to process, in a case that the first encryption manner matches the target object, the target object in the first encryption manner in response to the second input, where the first encryption manner is an encryption manner corresponding to the first encryption control.

In a third aspect, the embodiments of this application provide an electronic device, where the electronic device includes a processor, a memory, and a program or an instruction stored in the memory and executable on the processor, and when the program or the instruction is executed by the processor, the steps of the encryption method according to the first aspect are implemented.

In a fourth aspect, the embodiments of this application provide a non-transitory readable storage medium. The non-transitory readable storage medium stores a program or an instruction, and when the program or the instruction is executed by a processor, the steps of the encryption method according to the first aspect are implemented.

In a fifth aspect, the embodiments of this application provide a chip, where the chip includes a processor and a communications interface, the communications interface is coupled to the processor, and the processor is configured to run a program or an instruction, to implement steps of the encryption method according to the first aspect.

DESCRIPTION OF THE INVENTION

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art fall within the protection scope of this application.

The terms "first", "second", and the like in the description and the claims of this application are used to distinguish between similar objects, and do not need to be used to describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

In the embodiments of this application, words such as "exemplary" or "for example" are used to indicate an example, an instance, or descriptions. Any embodiment or design scheme described as "an example of" or "for example" in the embodiments of this application should not be explained as being more preferred or having more advantages than another embodiment or design scheme. To be precise, the use of the term such as "exemplary" or "for example" is intended to present a related concept in a specific manner.

The encryption method provided by the embodiments of this application will be described in detail below through some embodiments and application scenarios with reference to the accompanying drawings.

Figure 1:
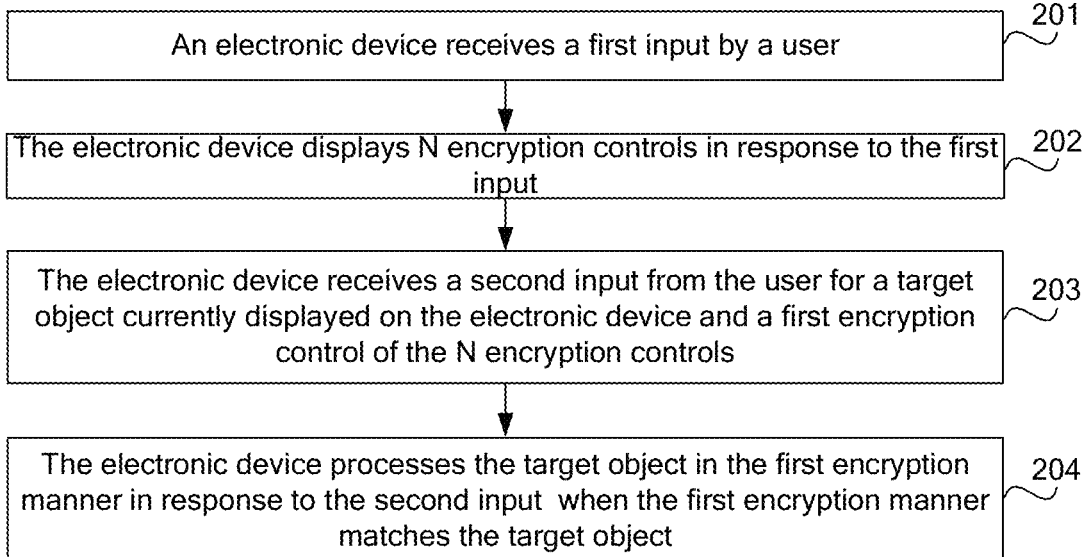
FIG. 1 is a schematic flowchart of an encryption method according to an embodiment of this application.

As shown in FIG. 1, the embodiments of this application provide an encryption method, which includes the following steps 201 to 204.

It should be noted that the execution subject of the encryption method provided in the embodiments of this application may be an encryption apparatus, or a control module in the encryption apparatus for executing the encryption method, or may also be an electronic device. This may be specifically determined according to an actual use requirement, and is not limited in this embodiment of this application. The encryption method provided in the embodiments of this application will be exemplarily described below by taking an electronic device as an example.

Step 201: An electronic device receives a first input by a user.

Step 202: The electronic device displays N encryption controls in response to the first input.

Each of the N encryption controls may correspond to an encryption manner, and N is a positive integer.

It should be noted that, in this embodiment of the application, the encryption control can also be called a privacy protection card, an encryption manner card or an encryption option card, which can be determined according to actual usage requirements, and is not limited in this embodiment of the application.

In the embodiments of this application, if the user wants to encrypt an object in the electronic device (such as an application program, content on a display, or a page, etc.), the user can trigger the electronic device to display the above N encryption controls through the first input, so that the user can select an encryption control from the N encryption controls, so as to trigger the electronic device to adopt the encryption manner corresponding to the encryption control, to encrypt the object that the user wants to encrypt.

In the embodiments of this application, when the electronic device displays the N encryption controls, the electronic device may enter a privacy protection mode. After the electronic device enters the privacy protection mode, by performing selection input for the encryption control of the N encryption controls and the object displayed by the electronic device, the user can trigger the electronic device to adopt the encryption manner corresponding to the encryption control to encrypt the object.

Optionally, in this embodiment of the application, the first input can be a single-click input, a double-click input, a long-press input, or a re-press input by the user in a preset region, or can be a voice input (for example, input voice information "enter the privacy protection mode"). This may be specifically determined according to an actual use requirement, and is not limited in this embodiment of this application.

Optionally, in the implementation of this application, the preset region may be an indicator bar region preset in the electronic device for virtual gesture navigation.

Figure 2A:
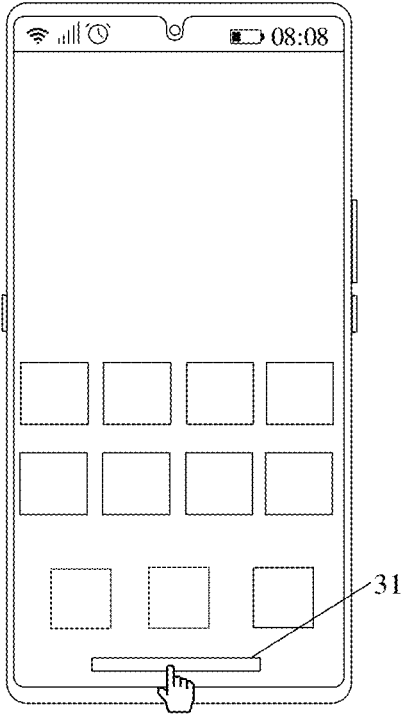
FIG. 2A is a schematic diagram 1 of an application interface of an encryption method according to an embodiment of this application.
Figure 2B:
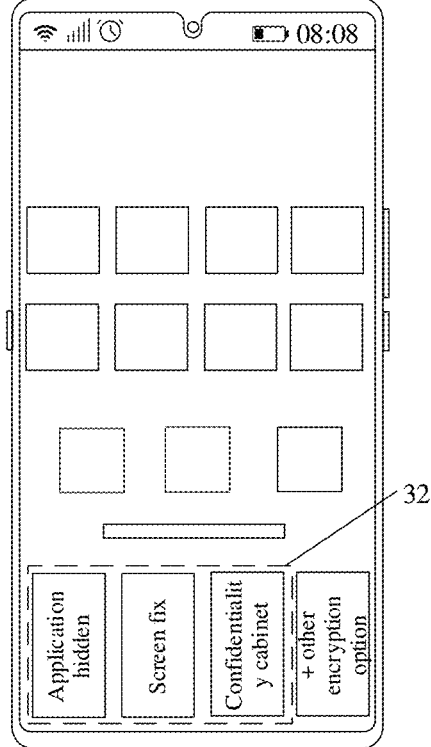
FIG. 2B is a schematic diagram 2 of an application interface of an encryption method according to an embodiment of this application.

Exemplarily, it is assumed that the first input is a long-press input by the user for the indicator bar region for virtual gesture navigation. Then, as shown in FIG. 2A, when the user long-presses the indicator bar region 31 for virtual gesture navigation, the electronic device enters the privacy protection mode in response to the input, and displays 3 encryption controls 32 in FIG. 2B.

Optionally, in this embodiment of this application, step 202 may be implemented by using step 202a.

Step 202*a*: The electronic device displays the N encryption controls in a target order in response to the first input.

The target order may be determined according to a target matching degree, which may be a matching degree between the object currently displayed on the electronic device and the encryption manner corresponding to each of the N encryption controls.

In the embodiments of this application, the matching degree between the object currently displayed on the electronic device and the encryption manner refers to: whether the object currently displayed on the electronic device can be encrypted in the encryption manner.

It can be understood that when all the objects currently displayed by the electronic device can be encrypted by an encryption manner, the matching degree between the objects currently displayed on the electronic device and the encryption manner is high; when a part of object currently displayed on the electronic device can be encrypted in a certain encryption manner, the matching degree between the object currently displayed on the electronic device and the encryption manner is medium; and when the object currently displayed on the electronic device cannot be encrypted in a certain encryption manner, the matching degree between the object currently displayed on the electronic device and the encryption manner is low.

Optionally, in this embodiment of this application, the electronic device may display the N encryption controls sequentially in descending order of the matching degrees between the objects currently displayed by the electronic device and all the N encryption controls.

In the embodiments of this application, when the object currently displayed by the electronic device cannot be encrypted in an encryption manner of the N encryption controls, the electronic device may display the encryption control corresponding to the encryption manner at a rear position of the N encryption controls, and display the encryption control in grey.

It should be noted that when the electronic device displays a certain encryption control in grey, the user cannot operate the encryption control.

Optionally, in this embodiment of this application, the N encryption controls may be displayed in a target display region, and the target display region supports functions such as left and right sliding, order adjustment of display positions of encryption controls, and addition of other encryption controls.

It can be understood that in the embodiments of this application, when the electronic device cannot display the N encryption controls in the target display region at one time, the user can perform left and right sliding input in the target display region to trigger the electronic device to display encryption controls that are in the N encryption controls and that are not displayed in the target display region on the electronic device.

Step 203: The electronic device receives a second input by the user for a target object currently displayed on the electronic device and a first encryption control of the N encryption controls.

Step 204: The electronic device processes the target object in the first encryption manner in response to the second input in a case that the first encryption manner matches the target object.

The first encryption manner is an encryption manner corresponding to the first encryption control.

In the embodiments of this application, after the electronic device displays the N encryption controls, after the electronic device receives the user's second input for the target object currently displayed on the electronic device and the first encryption control of the N encryption controls, the electronic device may determine whether the first encryption manner corresponding to the first encryption control matches the target object, and if the first encryption manner matches the target object, the electronic device may process the target object in the first encryption manner, thereby implementing encryption of the target object.

It should be noted that if the first encryption manner does not match the target object, the electronic device may perform any operation, or display prompt information to prompt the user that the first encryption manner does not match the target object.

In addition, whether the first encryption manner matches the target object refers to: whether the target object can be encrypted in the first encryption manner. If the target object can be encrypted in the first encryption manner, the electronic device can determine that the first encryption manner matches the target object; if the target object cannot be encrypted in the first encryption manner, the electronic device can determine that the first encryption manner does not match the target object.

In the embodiments of this application, the target object may be all objects in the current display interface of the electronic device, may also be some objects in the current display interface of the electronic device, and may also be the current display interface of the electronic device. Specifically, this may be determined according to actual usage requirements, and is not limited in this embodiment of the application.

Optionally, in this embodiment of the application, the target object can be an application icon, or can be a page, fragment, information, picture, or video in the application program, which may be specifically determined according to actual usage requirements, and is not limited in this embodiment of the application.

Optionally, in the embodiments of this application, the second input may be an input of dragging the target object onto the first encryption control; and may also be an input of continuous clicking on the target object and the first encryption control within a preset duration. This may be specifically determined according to an actual use requirement, and is not limited in this embodiment of this application.

Figure 3A:
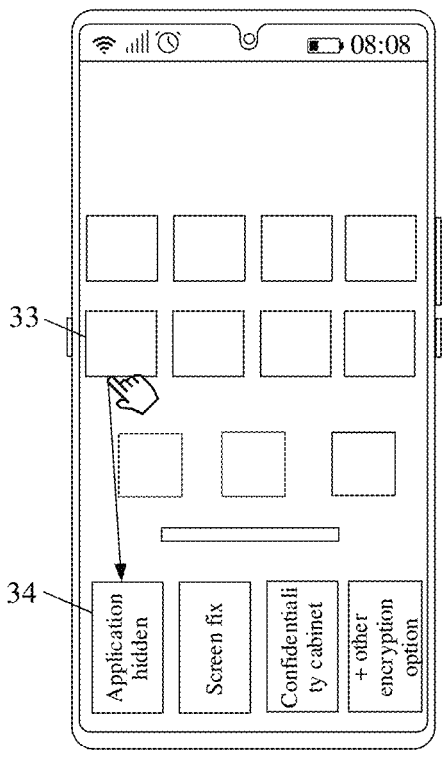
FIG. 3A is a schematic diagram 3 of an application interface of an encryption method according to an embodiment of this application.

In the embodiments of this application, it is assumed that the target object is an application icon, the first encryption control is an encryption control "application hidden", and as shown in FIG. 3A, the second input is an input of dragging the application icon 33 (that is, the target object) to the encryption control "application hidden" 34 (that is, the first encryption control). Then, after the electronic device receives the second input, the electronic device may encrypt the application program indicated by the application icon 33, that is, when the user triggers the electronic device to display the interface of the application program, authentication of identity information is required.

Figure 3B:
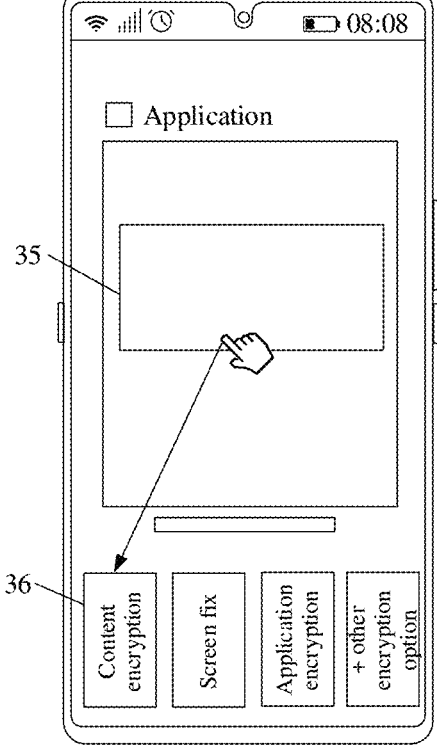
FIG. 3B is a schematic diagram 4 of an application interface of an encryption method according to an embodiment of this application.

It is assumed that the target object is content such as fragments, information, pictures, or videos in the application program, the first encryption control is an encryption control "content encryption", an encryption control "sticky note encryption", an encryption control "communication content encryption", or an encryption control "confidentiality cabinet", the second input is dragging the object 35 in the application program (that is, the target object) to the encryption control "content encryption" 36 (that is, the first encryption control) as shown in FIG. 3B. Then, after the electronic device receives the second input, the electronic device can replace the target object with shielded characters (such as the character "*" and the character "~"), and if the user wants to view the target object, the electronic device can prompt the user to input identity information, and if the identity information is successfully verified, the electronic device can display the target object.

It is assumed that the target object is a page in the application program, the first encryption control is the encryption control "display fix", and the second input is dragging the page of the application program (that is, the target object) to the encryption control "display fix" (that is, the first encryption control). Then, after the electronic device receives the second input, the electronic device may keep displaying the page. If the user wants to trigger the electronic device to display other pages, the electronic device may prompt the user to input identity information, and if the identity information is successfully verified, the electronic device may display other pages.

The embodiments of this application provide an encryption method. After receiving the first input, the N encryption controls can be displayed in response to the first input, and then after receiving the second input for the first encryption control of the N encryption controls and the target object, the target object can be directly processed in the first encryption manner in response to the second input if the first encryption manner corresponding to the first encryption control matches the target object, that is, the target object can be directly encrypted in the first encryption manner. In this way, through the encryption method provided by the embodiments of this application, the encryption manner can be flexibly selected, and the operation method of object encryption is more convenient.

Optionally, in this embodiment of the application, if the user wants to set a shortcut startup manner of a certain encryption manner in the electronic device, the user can trigger the electronic device to display an encryption manner setting interface through a specific input (for example, the third input in the embodiments of this application), thereby triggering the electronic device to display an encryption control corresponding to the encryption manner in the electronic device (for example, at least one encryption control in the embodiments of this application). Then, by inputting the encryption control corresponding to the encryption manner, the user can trigger the electronic device to display the shortcut start manner of the encryption manner (for example, the target shortcut startup manner) in a specific region (for example, the preset region in the embodiments of this application).

Optionally, the encryption method provided in the embodiment of this application may further include the following steps 205 to 208.

Step 205: The electronic device receives a third input by the user.

Step 206: The electronic device displays an encryption manner setting interface in response to the third input.

The encryption manner setting interface may include at least one encryption control, and the at least one encryption control may be an encryption control corresponding to the encryption manner in the electronic device.

In the embodiments of this application, the user can trigger the electronic device to display the encryption manner setting interface through the third input, so that the user can set the shortcut start manner of the encryption manner in the encryption manner setting interface.

It can be understood that the encryption manner setting interface may be an interface in the electronic device for setting the encryption manner in the electronic device. For example, the user can trigger the electronic device to perform the following operations by inputting in the encryption manner setting interface: setting the shortcut startup manner of the encryption manner, creating or deleting the encryption manner, and so on.

Optionally, in this embodiment of this application, the third input may be a slide-up input or a slide-down input by the user in the indicator bar region for virtual gesture navigation. This may be specifically determined according to an actual use requirement, and is not limited in this embodiment of this application.

Figure 4A:
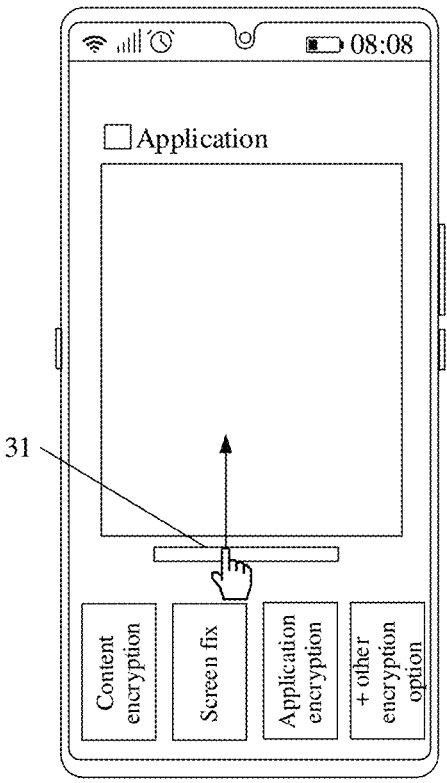
FIG. 4A is a schematic diagram 5 of an application interface of an encryption method according to an embodiment of this application.
Figure 4B:
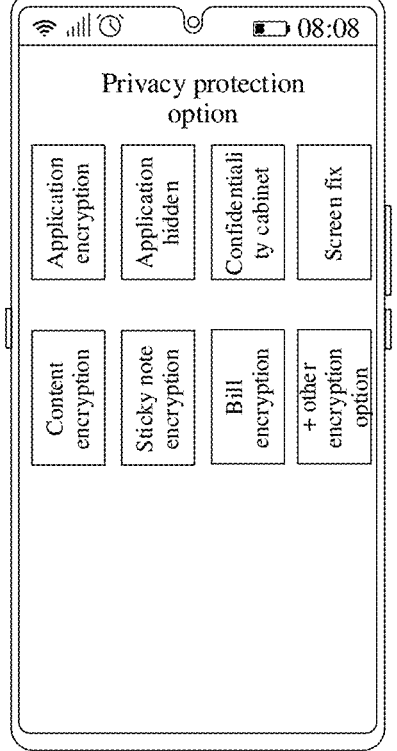
FIG. 4B is a schematic diagram 6 of an application interface of an encryption method according to an embodiment of this application.

Exemplarily, when the user slides up on the indicator bar region 31 for virtual gesture navigation as shown in FIG. 4A, the electronic device can display an encryption manner setting interface as shown in FIG. 4B in response to this input. This interface can include seven encryption controls, namely, the encryption control "application encryption", the encryption control "application hidden", the encryption control "confidentiality cabinet", the encryption control "display fix", the encryption control "content encryption", the encryption control "sticky note encryption", and the encryption control "bill encryption".

Step 207: The electronic device receives a fourth input by the user for a second encryption control of the at least one encryption control.

Step 208: The electronic device creates a target shortcut startup manner of the second encryption manner in response to the fourth input.

The second encryption manner is an encryption manner corresponding to the second encryption control.

In the embodiments of this application, after the electronic device displays the encryption manner setting interface, the user can trigger the electronic device to create the target shortcut startup manner of the second encryption manner by performing the fourth input for the second encryption control of the at least one encryption control.

Optionally, in this embodiment of this application, the electronic device may create the target shortcut startup manner in a preset region on the display of the electronic device. In this way, after the electronic device creates the target shortcut startup manner, by inputting in the preset region, the user can trigger the electronic device to display the object encryption interface corresponding to the second encryption manner.

Optionally, in this embodiment of the application, the preset region may be any possible region such as the upper left corner, the upper right corner, the lower left corner, or the lower right corner of the display of the electronic device, which may be determined according to actual usage requirements and is not limited in the embodiments of the present disclosure.

Optionally, in this embodiment of this application, the fourth input may be an input of dragging the second encryption control to the preset region; the fourth input may also include a first sub-input and a second sub-input, where the first sub-input may be a long-press input for the second encryption control, and the second sub-input may be an input for dragging the second encryption control to a preset region.

In the embodiment of this application, when the user long-presses the second encryption control, the electronic device can enter the editing mode in response to the input, and then the user can drag the second encryption control to the preset region, thereby triggering the electronic device to create the target shortcut startup manner of the second encryption manner, so that through input in the preset region, the user can directly trigger the electronic device to display the object encryption interface corresponding to the second encryption manner.

Figure 5A:
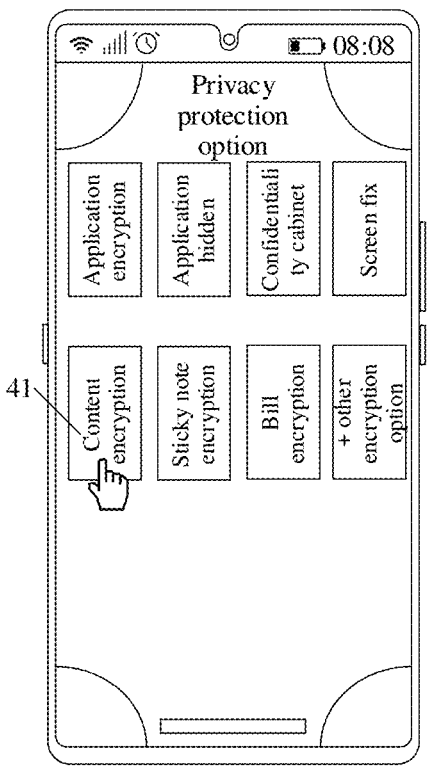
FIG. 5A is a schematic diagram 7 of an application interface of an encryption method according to an embodiment of this application.
Figure 5B:
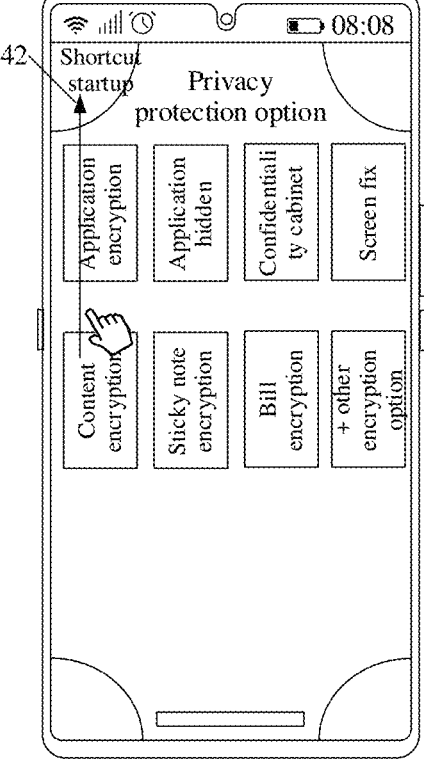
FIG. 5B is a schematic diagram 8 of an application interface of an encryption method according to an embodiment of this application.

Exemplarily, assuming that the fourth input includes the first sub-input and the second sub-input, and the second encryption control is an encryption control "content encryption", as shown in FIG. 5A, when the user long-presses the encryption control "content encryption" 41, the electronic device can enter the edit mode in response to the input, and then as shown in FIG. when the user drags the encryption control "content encryption" 41 to the upper left corner 42 of the display of the electronic device, the electronic device can create a target shortcut startup manner of the encryption manner of "content encryption" in the upper left corner 42 of the display of the electronic device in response to the input.

Optionally, in this embodiment of this application, after the electronic device creates the target shortcut startup manner set for the second encryption manner, the electronic device may cancel the display of the second encryption control in the encryption manner setting interface, or the electronic device may display the second encryption control in the last display position of the encryption manner setting interface, or the electronic device may keep displaying the second encryption control in a display position where the second encryption control is located before receiving the fourth input. This may be specifically determined according to an actual use requirement, and is not limited in this embodiment of this application.

In the embodiments of this application, since the user can trigger the electronic device to create a shortcut startup manner of the encryption manner in the encryption manner setting interface, the user can trigger the electronic device to create a shortcut startup manner of a common encryption manner. In this way, when the user wants to view the object processed in the encryption manner, the user can directly trigger, through the input of the shortcut startup manner, display of the object processed in the encryption manner in the electronic device, which can simplify the operation of the user in the electronic device.

Optionally, after the electronic device creates the target shortcut startup manner of the second encryption manner, the user can trigger the electronic device to cancel the target shortcut startup manner through a specific input (such as the fifth input in the embodiment of this application), and display the second encryption control in the first display position in the encryption manner setting interface.

In the embodiments of this application, after the above step 208, the encryption method provided in the embodiment of this application may further include the following steps 209 and 210.

Step 209: The electronic device receives a fifth input by the user.

Step 210: In response to the fifth input, the electronic device cancels the target shortcut startup manner, and displaying the second encryption control in the first display position of the encryption manner setting interface.

In this embodiment of this application, after the electronic device creates the target shortcut startup manner of the second encryption manner, the user can trigger the electronic device to cancel the target shortcut startup manner through the fifth input, and the electronic device can display the second encryption control in the first display position of the encryption manner setting interface.

Optionally, when the electronic device displays the encryption manner setting interface, the identifier of the second encryption manner is displayed in the preset region, and the user can perform an input of dragging the identifier out of the preset region (that is, the fifth input) to trigger the electronic device to cancel the target shortcut startup manner.

Optionally, when the electronic device displays the encryption manner setting interface, the user can trigger the electronic device to cancel the target shortcut startup manner by sliding from outside to inside or from inside to outside in the preset region (that is, the fifth input).

Optionally, by inputting on an identifier indicating the encryption manner (such as the first object in the embodiment of this application), the user can trigger the electronic device to display the identifier of the object processed in the encryption manner (such as K encryption object identifiers in the embodiment of this application), and then by inputting on a certain encryption object identifier (such as the first encryption object identifier in the embodiment of this application) of these encryption object identifiers, the user can trigger the electronic device to cancel the encryption of an encryption object indicated by the encryption object identifier.

Optionally, the encryption method provided in the embodiment of this application may further include the following steps 211 to 214.

Step 211: The electronic device receives a sixth input for the first object.

The first object may be used to indicate the third encryption manner in the electronic device.

Step 212: The electronic device displays K encryption object identifiers in response to the sixth input.

Encryption objects indicated by the K encryption object identifiers may be objects processed in a third encryption manner, and K is a positive integer.

In this embodiment of this application, through the sixth input for the first object, the user can trigger the electronic device to display the identifiers of the K encryption objects processed in the third encryption manner (that is, the K encryption object identifiers).

It can be understood that each of the K encryption object identifiers respectively indicates an encryption object.

Optionally, the first object may be a third encryption control corresponding to the third encryption manner, or may be an identifier of a shortcut startup manner of the third encryption manner, which may be determined according to actual usage requirements, and is not limited in this embodiment of this application.

Optionally, the sixth input may be any possible input such as single-click input, a double-click input, a long-press input, or a re-press input for the first object, which may be determined according to actual usage requirements, and is not limited in this embodiment of the application.

Figure 6A:
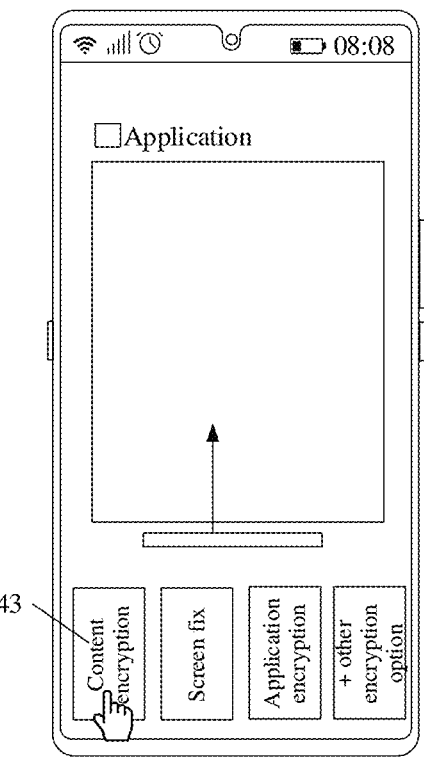
FIG. 6A is a schematic diagram 9 of an application interface of an encryption method according to an embodiment of this application.
Figure 6B:
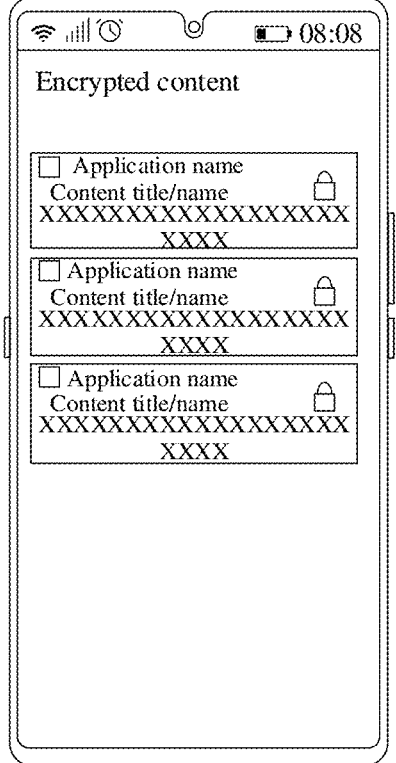
FIG. 6B is a schematic diagram 10 of an application interface of an encryption method according to an embodiment of this application.

Exemplarily, assuming that the first object is the encryption control "content encryption", and the sixth input is a single-click input, as shown in FIG. 6A, when the user clicks on the encryption control "content encryption" 43, the electronic device may display an object encryption page in response to the input, and the object encryption page may include 3 encryption object identifiers (that is, the K encryption object identifiers) as shown in FIG. 6B.

Step 213: The electronic device receives a seventh input by the user for a first encryption object identifier of the K encryption object identifiers.

Step 214: The electronic device cancels, in response to the seventh input, the encryption of an encryption object indicated by the first encryption object identifier.

In this embodiment of this application, after the electronic device displays the K encryption object identifiers, the user can trigger, through the seventh input for the first encryption object identifier, the electronic device to cancel the encryption of the encryption object indicated by the first encryption object identifier.

Optionally, in this embodiment of this application, the first encryption object identifier may be one encryption object identifier of the K encryption object identifiers, or may be multiple encryption object identifiers of the K encryption object identifiers. Specifically, this may be determined according to actual usage requirements, and is not limited in this embodiment of the application.

In a possible implementation manner, after the electronic device receives the sixth input, the electronic device may display a "cancel encryption" control at the bottom of the display of the electronic device in response to the sixth input. The seventh input may be an input of dragging the first encryption object identifier to the "cancel encryption" control.

Figure 7A:
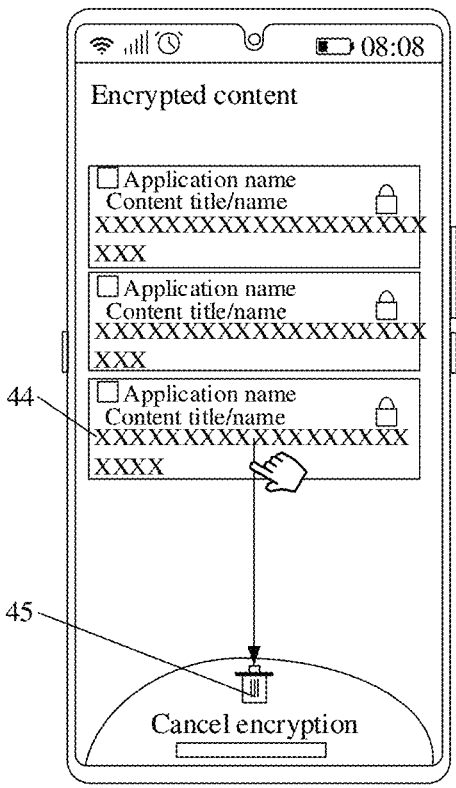
FIG. 7A is a schematic diagram 11 of an application interface of an encryption method according to an embodiment of this application.
Figure 7B:
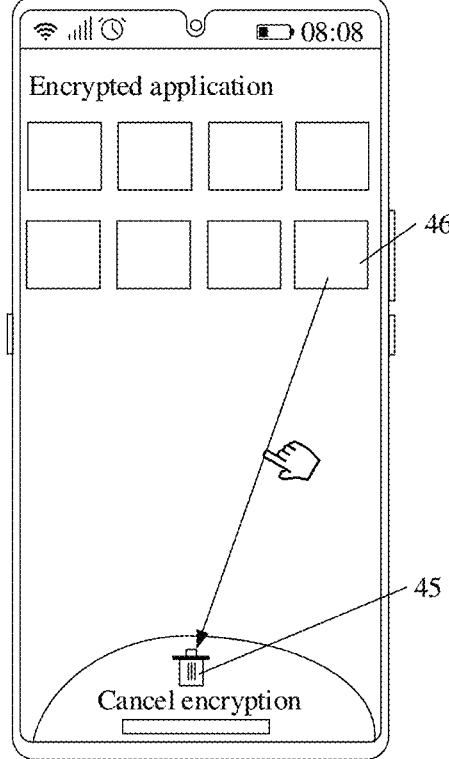
FIG. 7B is a schematic diagram 12 of an application interface of an encryption method according to an embodiment of this application.

Exemplarily, as shown in FIG. 7A, when the user drags the encryption object identifier 44 to the "cancel encryption" control 45, the electronic device can cancel the encryption of the encryption object indicated by the encryption object identifier 44, so that the user can directly trigger the electronic device to display the object. Alternatively, as shown in FIG. 7B, when the user drags the encryption object identifier 46 to the "cancel encryption" control 45, the electronic device can cancel the encryption of the encryption object indicated by the encryption object identifier 46, so that the user can directly trigger the electronic device to display an interface of an application program indicated by the application icon.

In another possible implementation, the seventh input may include a third sub-input and a fourth sub-input, the third sub-input may be a long-press input for the first encryption object identifier, when the user long-presses the first encryption object identifier, the electronic device may display a delete control on the first encryption object identifier in response to the input, and the fourth sub-input may be a click input for the delete control. When the user clicks on the delete control, the electronic device may cancel, in response to the input, encryption of the encryption object indicated by the first encryption object identifier.

Optionally, in this embodiment of the application, the user can input for an identifier (such as the second object in the embodiment of the application) indicating a certain encryption manner in the electronic device (such as the fourth encryption manner in the embodiment of the application), to trigger the electronic device to display the identity information verification interface, and then when the identity information input by the user (such as the target identity information in the embodiment of this application) matches the preset identity information in the electronic device, the electronic device can display the object (such as the M encryption objects in the implementation of this application) processed in the encryption manner, so that the user can view the object processed in the encryption manner.

Optionally, the encryption method provided in the embodiment of this application may further include the following steps 215 to 218.

Step 215: The electronic device receives an eighth input by the user for the second object.

The second object may be used to indicate a fourth encryption manner in the electronic device.

Step 216: The electronic device displays an identity information verification interface in response to the eighth input.

In the embodiments of this application, the user can trigger, through the eighth input for the second object, the electronic device to display the identity information verification interface, so that the user can input identity information in the interface for identity information verification.

Optionally, in this embodiment of the application, the second object may be the fourth encryption control corresponding to the fourth encryption manner, or may be a shortcut startup manner of the fourth encryption manner, which may be determined according to actual use requirements, and is not limited in this embodiment of this application.

Optionally, in the embodiments of this application, the eighth input may be any possible input such as single-click input, a double-click input, a drag input, or a slide input for the second object, which may be determined according to actual usage requirements, and is not limited in this embodiment of the application.

Figure 8A:
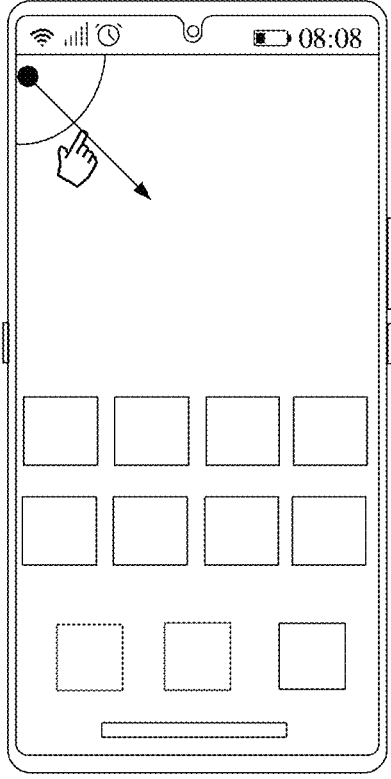
FIG. 8A is a schematic diagram 13 of an application interface of an encryption method according to an embodiment of this application.
Figure 8B:
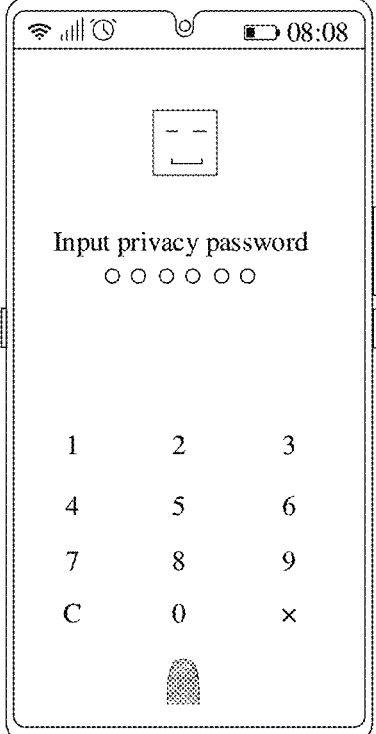
FIG. 8B is a schematic diagram 14 of an application interface of an encryption method according to an embodiment of this application.

Exemplarily, assuming that the second object is a shortcut startup manner corresponding to the fourth encryption manner, and the shortcut startup manner is created in the upper left corner of the display of the electronic device; as shown in FIG. 8A, the user can slide from outside to inside on the upper left corner of the display of the electronic device to trigger the electronic device to display the identity information verification interface as shown in FIG. 8B.

Figure 9A:
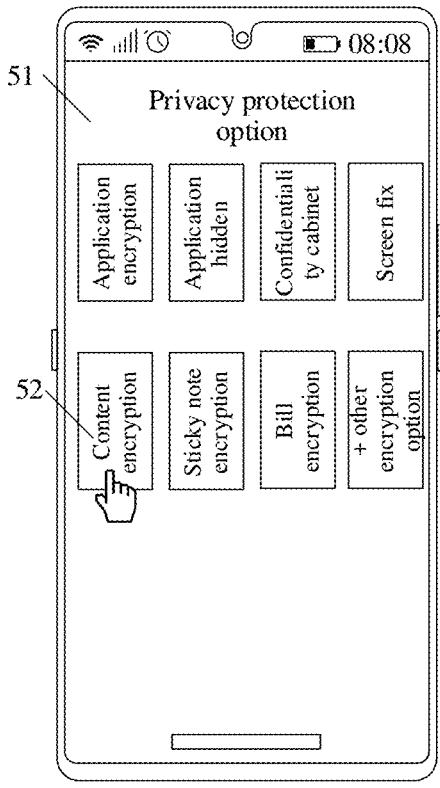
FIG. 9A is a schematic diagram 15 of an application interface of an encryption method according to an embodiment of this application.
Figure 9B:
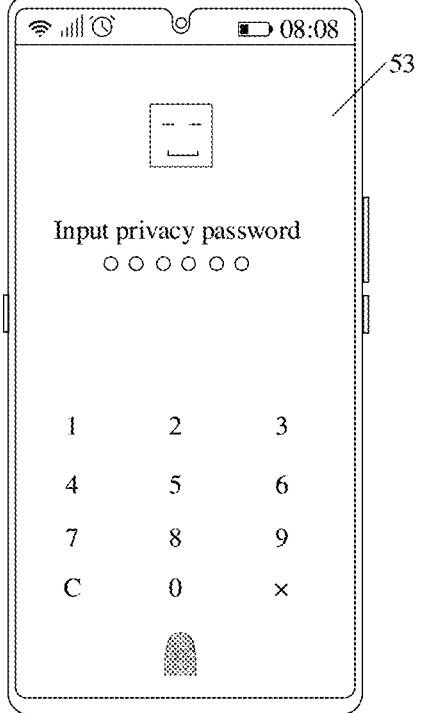
FIG. 9B is a schematic diagram 16 of an application interface of an encryption method according to an embodiment of this application.

Optionally, in this embodiment of the application, by performing a double clicking input or a long-press input in the indicator bar region for virtual gesture navigation, the user can trigger the electronic device to display the encryption control interface (for example, the interface 51 shown in FIG. 9A), the encryption control interface may include multiple encryption controls, so that the user can trigger the electronic device to display the identity information verification interface by inputting on the fourth encryption control (such as the encryption control 52 shown in FIG. 9A), to trigger the electronic device to display the identity information verification interface (for example, the interface 53 shown in FIG. 9B).

Figure 10A:
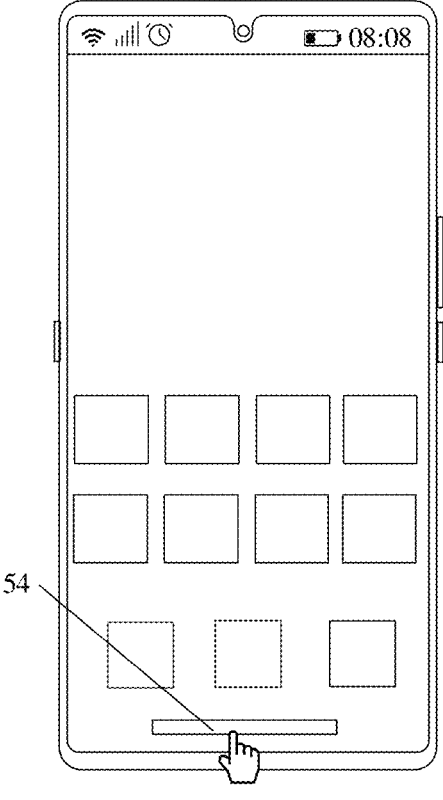
FIG. 10A is a schematic diagram 17 of an application interface of an encryption method according to an embodiment of this application.
Figure 10B:
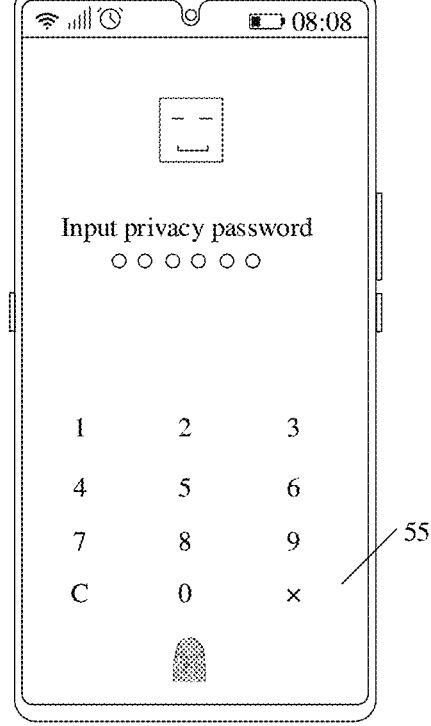
FIG. 10B is a schematic diagram 18 of an application interface of an encryption method according to an embodiment of this application.

Optionally, in this embodiment of this application, after the electronic device receives the user's double-click input or long-press input in the indicator bar region for virtual gesture navigation (such as the indicator bar region 54 shown in FIG. 10A), the electronic device can first display the identity information verification interface (such as the interface 55 shown in FIG. 10B), and when the identity information input by the user matches the preset identity information in the electronic device, the electronic device can display the encryption control interface. In this way, multi-layer encryption protection can be performed, thereby improving privacy protection.

Step 217: The electronic device determines whether the input target identity information matches the preset identity information.

In the embodiment of this application, after the electronic device displays the identity information verification interface, the user can input the target identity information in the identity information verification interface, so that the electronic device can determine that the target identity information matches the preset identity information in the electronic device. If the target identity information does not match the preset identity information, the electronic device may prompt the user that the input identity information is incorrect; if the target identity information matches the preset identity information, the electronic device may display the object processed in the fourth encryption manner (for example, M encryption objects in the embodiment of this application), that is, when the input target identity information matches the preset identity information, the electronic device executes the following step 218.

Step 218: The electronic device displays the M encryption objects in the form of plain text.

The M encryption objects may be objects processed in the fourth encryption manner, and M is a positive integer.

In the embodiment of this application, when the target identity information input by the user matches the preset identity information, the electronic device can display the M encryption objects in the form of plain text, so that the user can directly view all objects processed in the fourth encryption manner.

It can be understood that when the electronic device displays the M encryption objects in the form of plain text, the contents of the M encryption objects are all visible to the user.

Optionally, in this embodiment of the application, before the electronic device displays the M encryption objects, the electronic device may first display the identifiers of the M encryption objects. If the user wants to view a certain encryption object of the M encryption objects, the user can input for the identifier of the encryption object, and the electronic device can display the identity information verification interface in response to the input, and if the identity information input by the user matches the preset identity information, the electronic device displays the encryption object. In this way, multi-layer encryption protection can be performed on encryption objects, thereby improving privacy protection.

The encryption device provided in the embodiments of this application will be described below by taking the encryption apparatus executing the encryption method in the embodiments of this application as an example.

Figure 11:
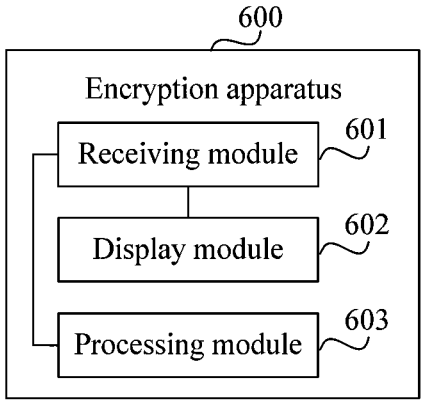
FIG. 11 is a schematic structural diagram of an encryption apparatus according to an embodiment of this application.

As shown in FIG. 11, this embodiment of this application provides an encryption apparatus 600, and the encryption apparatus 600 includes a receiving module 601, a display module 602, and a processing module 603. The receiving module 601 is configured to receive a first input by a user; the display module 602 is configured to display N encryption controls in response to the first input, where each of the N encryption controls corresponds to an encryption manner; the receiving module 601 is further configured to receive a second input by the user for a target object currently displayed on the electronic device and a first encryption control of the N encryption controls; and the processing module 603 is configured to process, in a case that the first encryption manner matches the target object, the target object in the first encryption manner in response to the second input, where the first encryption manner is an encryption manner corresponding to the first encryption control.

Optionally, the display module may be configured to display the N encryption controls according to a target order; where the target order is determined according to a target matching degree, and the target matching degree is a matching degree between the object currently displayed on the electronic device and an encryption manner corresponding to each of the N encryption controls.

Optionally, the encryption device further includes a setting module; the receiving module is further configured to receive a third input by the user; the display module is further configured to display an encryption manner setting interface in response to the third input, where the encryption manner setting interface includes at least one encryption control, and the at least one encryption control is an encryption control corresponding to the encryption manner in the electronic device; the receiving module is further configured to receive a fourth input by the user for a second encryption control of the at least one encryption control; and the setting module is configured to create a target shortcut startup manner of the second encryption manner in response to the fourth input, where the second encryption manner is an encryption manner corresponding to the second encryption control.

Optionally, the receiving module is further configured to receive a fifth input by the user; the setting module is further configured to in response to the fifth input, cancel the target shortcut startup manner; and the display module is further configured to in response to the fifth input, display the second encryption control in the first display position of the encryption manner setting interface.

Optionally, the receiving module is further configured to receive a sixth input for a first object, where the first object is used to indicate a third encryption manner in the electronic device; the display module is further configured to display K encryption object identifiers in response to the sixth input, where encryption objects indicated by the K encryption object identifiers are objects processed in a third encryption manner, and K is a positive integer; the receiving module is further configured to receive a seventh input by the user for a first encryption object identifier of the K encryption object identifiers: and the processing module is further configured to cancel, in response to the seventh input, encryption of an encryption object indicated by the first encryption object identifier.

Optionally, the receiving module is further configured to receive an eighth input by the user for a second object, where the second object is used to indicate a fourth encryption manner in the electronic device; the display module is further configured to display an identity information verification interface in response to the eighth input received by the receiving module; and display M encryption objects in the form of plain text in a case that input target identity information matches preset identity information, where the M encryption objects are objects processed in the fourth encryption manner, and M is a positive integer.

The embodiments of this application provide an encryption apparatus. After receiving the first input, the N encryption controls can be displayed in response to the first input, and then after receiving the second input for the first encryption control of the N encryption controls and the target object, the target object can be directly processed in the first encryption manner in response to the second input if the first encryption manner corresponding to the first encryption control matches the target object, that is, the target object can be directly encrypted in the first encryption manner. In this way, through the encryption apparatus provided by the embodiments of this application, the encryption manner can be flexibly selected, and the operation method of object encryption is more convenient.

The encryption apparatus in the embodiments of this application may be an apparatus, and may also be a component, an integrated circuit, or a chip in an electronic device. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a personal computer (PC), a television (TV), an automated teller machine or a self-service machine. This is not specifically limited in the embodiments of this application.

The encryption apparatus in the embodiments of this application may be an apparatus with an operating system. The operating system may be an Android operating system, may be an iOS operating system, or may be another possible operating system. This is not specifically limited in this embodiment of this application.

The encryption apparatus provided in this embodiment of the application can implement the processes that are implemented in the foregoing method embodiments. To avoid repetition, details are not described herein again.

Figure 12:
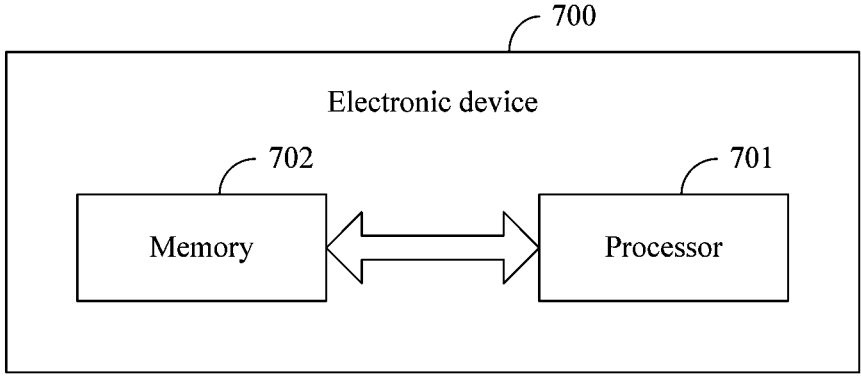
FIG. 12 is a schematic structural diagram of an electronic device according to an embodiment of this application.

Optionally, as shown in FIG. 12, the embodiments of this application further provide an electronic device 700, including a processor 701, a memory 702, and a program or instruction stored in the memory 702 and executable on the processor 701, When the program or instruction is executed by the processor 701, each process of the encryption method embodiment described above can be realized, and the same technical effect can be achieved. To avoid repetition, details are not repeated herein.

It should be noted that the electronic device in this embodiment of this application includes the foregoing mobile electronic device and the foregoing non-mobile electronic device.

Figure 13:
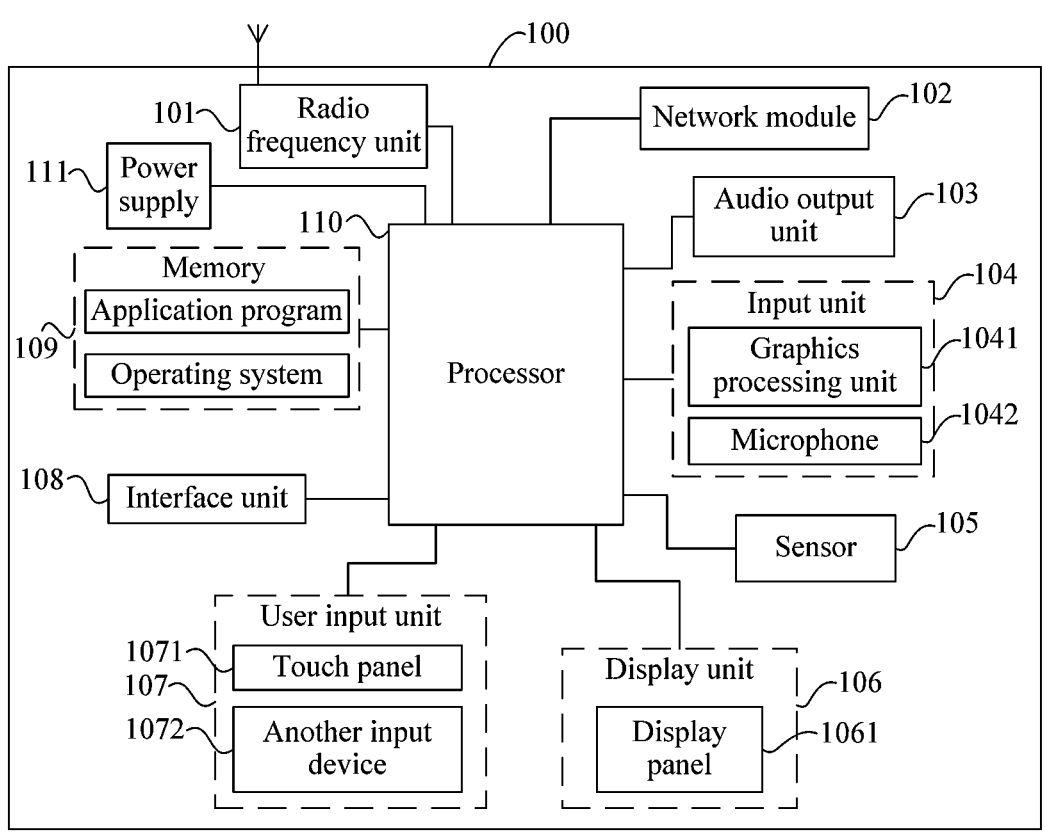
FIG. 13 is a schematic diagram of hardware of an electronic device according to an embodiment of this application.

FIG. 13 is a schematic diagram of a hardware structure of an electronic device for implementing embodiments of this application.

The electronic device 100 includes, but is not limited to: a radio frequency unit 101, a network module 102, an audio output unit 103, an input unit 104, a sensor 105, a display unit 106, a user input unit 107, an interface unit 108, a memory 109, a processor 110, and the like.

Those skilled in the art can understand that the electronic device 100 may further include the power supply 111 (for example, a battery) supplying power to each component. Preferably, the power supply may be logically connected to the processor 110 by using a power management system, so as to implement functions such as charging management, discharging management and power consumption management by using the power management system. A structure of the electronic device shown in FIG. 13 does not constitute a limitation on the electronic device, and may include more or fewer parts than those shown in the figure, or combine some components, or have different part arrangements. Details are not described herein again.

The user input unit 107 is configured to receive a first input by a user; the display unit 106 is configured to display N encryption controls in response to the first input, where each of the N encryption controls corresponds to an encryption manner; the user input unit 107 is further configured to receive a second input by the user for a target object currently displayed on the electronic device and a first encryption control of the N encryption controls; and the display unit 106 is configured to process, in a case that the first encryption manner matches the target object, the target object in the first encryption manner in response to the second input, where the first encryption manner is an encryption manner corresponding to the first encryption control.

Optionally, the display unit 106 may be configured to display the N encryption controls according to a target order; where the target order is determined according to a target matching degree, and the target matching degree is a matching degree between the object currently displayed on the electronic device and an encryption manner corresponding to each of the N encryption controls.

Optionally, the user input unit 107 is further configured to receive a third input by the user; the display unit 106 is further configured to display an encryption manner setting interface in response to the third input, where the encryption manner setting interface includes at least one encryption control, and the at least one encryption control is an encryption control corresponding to the encryption manner in the electronic device; the user input unit 107 is further configured to receive a fourth input by the user for a second encryption control of the at least one encryption control; and the processor 110 is configured to create a target shortcut startup manner of the second encryption manner in response to the fourth input, where the second encryption manner is an encryption manner corresponding to the second encryption control.

Optionally, the user input unit 107 is further configured to receive a fifth input by the user; the processor 110 is further configured to in response to the fifth input, cancel the target shortcut startup manner, and the display unit 106 is further configured to in response to the fifth input, display the second encryption control in the first display position of the encryption manner setting interface.

Optionally, the user input unit 107 is further configured to receive a sixth input by the user for a first object, where the first object is used to indicate a third encryption manner in the electronic device; the display unit 106 is further configured to display K encryption object identifiers in response to the sixth input, where encryption objects indicated by the K encryption object identifiers are objects processed in a third encryption manner, and K is a positive integer; the user input unit 107 is further configured to receive a seventh input by the user for a first encryption object identifier of the K encryption object identifiers: and the processor 110 is configured to cancel, in response to the seventh input, encryption of an encryption object indicated by the first encryption object identifier.

Optionally, the user input unit 107 is further configured to receive an eighth input by the user for a second object, where the second object is used to indicate a fourth encryption manner in the electronic device; the display unit 106 is further configured to display an identity information verification interface in response to the eighth input; and display M encryption objects in the form of plain text in a case that input target identity information matches preset identity information, where the M encryption objects are objects processed in the fourth encryption manner, and M is a positive integer.

The embodiments of this application provide an electronic device. After receiving the first input, the N encryption controls can be displayed in response to the first input, and then after receiving the second input for the first encryption control of the N encryption controls and the target object, the target object can be directly processed in the first encryption manner in response to the second input if the first encryption manner corresponding to the first encryption control matches the target object, that is, the target object can be directly encrypted in the first encryption manner. In this way, the encryption manner can be flexibly selected in the electronic device, and the operation method of encrypting the object through the electronic device is more convenient.

It should be noted that, in the embodiments of this application, the receiving module in the encryption apparatus can be realized through the user input unit 107; the display module in the encryption apparatus can be realized through the display unit 106; and the processing module and the setting module in the encryption apparatus can be realized by the processor 110.

It should be understood that, in this embodiment of this application, the radio frequency unit 101 includes, but is not limited to, an antenna, at least one amplifier, a transceiver, a coupler, a low noise amplifier, a duplexer, and the like. The electronic device provides wireless broadband Internet access for the user by using the network module 102, for example, helping the user to send and receive an e-mail, brows a web page, and access streaming media. The audio output unit 103 may include a speaker, a buzzer, and a receiver. The input unit 104 may include a graphics processing unit (GPU) 1041 and a microphone 1042. The graphics processing unit 1041 processes image data of a static picture or a video obtained by an image capture apparatus (for example, a camera) in a video capture mode or image capture mode. The display unit 106 may include a display panel 1061. Optionally, the display panel 1061 may be configured in a form such as a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application program and an operating system. The processor 110 may be integrated with an application processor and a modem processor. The application processor mainly processes an operating system, a user interface, an application program, and the like. The modem processor mainly processes wireless communication. It can be understood that, alternatively, the modem processor may not be integrated into the processor 110.

An embodiment of this application further provides a non-transitory readable storage medium. The non-transitory readable storage medium stores a program or an instruction, and when the program or the instruction is executed by a processor, the various processes of the foregoing encryption method embodiment is performed and the same technical effects can be achieved. To avoid repetition, details are not described herein again.

The processor is the processor in the electronic device in the foregoing embodiment. The non-transitory readable storage medium may include a non-transitory computer readable storage medium, such as a computer read-only memory (ROM), a random access memory (RAM), a magnetic disk or an optical disk, and the like.

An embodiment of this application further provides a chip, the chip includes a processor and a communication interface, the communication interface is coupled to the processor, and the processor is configured to run programs or instructions to implement each process of the embodiment of the foregoing encryption method and the same technical effects can be achieved. To avoid repetition, details are not described herein again.

It should be understood that the chip mentioned in this embodiment of this application may also be referred to as a system-level chip, a system chip, a chip system, or a system on a chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Through the description of the above embodiments, those skilled in the art can clearly understand that the methods of the above embodiments can be implemented by means of software plus a necessary general-purpose hardware platform, and of course also by hardware, but in many cases the former is better implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing an electronic device (which may be a mobile phone, a computer, a server, an air conditioner, a network device, or the like) to perform the methods in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

What is claimed is:

1. An encryption method, comprising:
   receiving a first input by a user;
   displaying N encryption controls in response to the first input, wherein each of the N encryption controls corresponds to an encryption manner;
   receiving a second input by the user for a target object currently displayed on the electronic device and a first encryption control of the N encryption controls; and
   processing, in a case that a first encryption manner matches the target object, the target object in the first encryption manner in response to the second input, wherein the first encryption manner is an encryption manner corresponding to the first encryption control;
   the method further comprises:
   receiving a third input by a user;
   displaying an encryption manner setting interface in response to the third input, wherein the encryption manner setting interface comprises at least one encryption control;
   receiving a fourth input by the user for a second encryption control of the at least one encryption control; and
   creating a target shortcut startup manner of the second encryption manner in response to the fourth input, wherein the second encryption manner is an encryption manner corresponding to the second encryption control.

2. The method according to claim 1, wherein the displaying N encryption controls comprises:

displaying the N encryption controls according to a target order;

wherein the target order is determined according to a target matching degree, and the target matching degree is a matching degree between a object currently displayed on the electronic device and an encryption manner corresponding to each of the N encryption controls.

3. The method according to claim 1, wherein after the creating a target shortcut startup manner of the second encryption manner, the method further comprises:

receiving a fifth input by the user; and in response to the fifth input, canceling the target shortcut startup manner, and displaying the second encryption control in a first display position of the encryption manner setting interface.

4. The method according to claim 1, wherein the method further comprises:

receiving a sixth input by the user for a first object, wherein the first object is used to indicate a third encryption manner in the electronic device;

displaying K encryption object identifiers in response to the sixth input, wherein encryption objects indicated by the K encryption object identifiers are objects processed in a third encryption manner, and K is a positive integer;

receiving a seventh input by the user for a first encryption object identifier of the K encryption object identifiers; and canceling, in response to the seventh input, encryption of an encryption object indicated by the first encryption object identifier.

5. The method according to claim 1, wherein the method further comprises:

receiving an eighth input by the user for a second object, wherein the second object is used to indicate a fourth encryption manner in the electronic device;

displaying an identity information verification interface in response to the eighth input; and displaying M encryption objects in the form of plain text in a case that input target identity information matches preset identity information, wherein the M encryption objects are objects processed in the fourth encryption manner, and M is a positive integer.

6. An electronic device, comprising a processor, a memory, and a program or instruction stored on the memory and executable on the processor, wherein the program or instruction, when executed by the processor, causes the electronic device to perform:

receiving a first input by a user;

displaying N encryption controls in response to the first input, wherein each of the N encryption controls corresponds to an encryption manner;

receiving a second input by the user for a target object currently displayed on the electronic device and a first encryption control of the N encryption controls; and processing, in a case that a first encryption manner matches the target object, the target object in the first encryption manner in response to the second input, wherein the first encryption manner is an encryption manner corresponding to the first encryption control; wherein the program or instruction, when executed by the processor, causes the electronic device further to perform:

receiving a third input by a user;

displaying an encryption manner setting interface in response to the third input, wherein the encryption manner setting interface comprises at least one encryption control;

receiving a fourth input by the user for a second encryption control of the at least one encryption control; and creating a target shortcut startup manner of the second encryption manner in response to the fourth input, wherein the second encryption manner is an encryption manner corresponding to the second encryption control.

7. The electronic device according to claim 6, wherein the program or instruction, when executed by the processor, causes the electronic device to perform:

displaying the N encryption controls according to a target order;

wherein the target order is determined according to a target matching degree, and the target matching degree is a matching degree between a object currently displayed on the electronic device and an encryption manner corresponding to each of the N encryption controls.

8. The electronic device according to claim 6, wherein the program or instruction, when executed by the processor, causes the electronic device further to perform:

receiving a fifth input by the user; and in response to the fifth input, canceling the target shortcut startup manner, and displaying the second encryption control in a first display position of the encryption manner setting interface.

9. The electronic device according to claim 6, wherein the program or instruction, when executed by the processor, causes the electronic device further to perform:

receiving a sixth input by the user for a first object, wherein the first object is used to indicate a third encryption manner in the electronic device;

displaying K encryption object identifiers in response to the sixth input, wherein encryption objects indicated by the K encryption object identifiers are objects processed in a third encryption manner, and K is a positive integer;

receiving a seventh input by the user for a first encryption object identifier of the K encryption object identifiers; and canceling, in response to the seventh input, encryption of an encryption object indicated by the first encryption object identifier.

10. The electronic device according to claim 6, wherein the program or instruction, when executed by the processor, causes the electronic device further to perform:

receiving an eighth input by the user for a second object, wherein the second object is used to indicate a fourth encryption manner in the electronic device;

displaying an identity information verification interface in response to the eighth input; and displaying M encryption objects in the form of plain text in a case that input target identity information matches preset identity information, wherein the M encryption objects are objects processed in the fourth encryption manner, and M is a positive integer.

11. A non-transitory readable storage medium, storing a program or an instruction, wherein the program or instruction, when executed by a processor of an electronic device, causes the electronic device to perform:

receiving a first input by a user;

displaying N encryption controls in response to the first input, wherein each of the N encryption controls corresponds to an encryption manner;

receiving a second input by the user for a target object currently displayed on the electronic device and a first encryption control of the N encryption controls; and processing, in a case that a first encryption manner matches the target object, the target object in the first encryption manner in response to the second input, wherein the first encryption manner is an encryption manner corresponding to the first encryption control; wherein the program or instruction, when executed by the processor, causes the electronic device further to perform:

receiving a third input by a user;

displaying an encryption manner setting interface in response to the third input, wherein the encryption manner setting interface comprises at least one encryption control;

receiving a fourth input by the user for a second encryption control of the at least one encryption control; and creating a target shortcut startup manner of the second encryption manner in response to the fourth input, wherein the second encryption manner is an encryption manner corresponding to the second encryption control.

12. The non-transitory readable storage medium according to claim 11, wherein the program or instruction, when executed by the processor, causes the electronic device to perform:

displaying the N encryption controls according to a target order;

wherein the target order is determined according to a target matching degree, and the target matching degree is a matching degree between a object currently displayed on the electronic device and an encryption manner corresponding to each of the N encryption controls.

13. The non-transitory readable storage medium according to claim 11, wherein the program or instruction, when executed by the processor, causes the electronic device further to perform:

receiving a fifth input by the user; and in response to the fifth input, canceling the target shortcut startup manner, and displaying the second encryption control in a first display position of the encryption manner setting interface.

14. The non-transitory readable storage medium according to claim 11, wherein the program or instruction, when executed by the processor, causes the electronic device further to perform:

receiving a sixth input by the user for a first object, wherein the first object is used to indicate a third encryption manner in the electronic device;

displaying K encryption object identifiers in response to the sixth input, wherein encryption objects indicated by the K encryption object identifiers are objects processed in a third encryption manner, and K is a positive integer;

receiving a seventh input by the user for a first encryption object identifier of the K encryption object identifiers; and canceling, in response to the seventh input, encryption of an encryption object indicated by the first encryption object identifier.

15. The non-transitory readable storage medium according to claim 11, wherein the program or instruction, when executed by the processor, causes the electronic device further to perform:

receiving an eighth input by the user for a second object, wherein the second object is used to indicate a fourth encryption manner in the electronic device;

displaying an identity information verification interface in response to the eighth input; and displaying M encryption objects in the form of plain text in a case that input target identity information matches preset identity information, wherein the M encryption objects are objects processed in the fourth encryption manner, and M is a positive integer.

16. A computer program product, wherein the computer program product is executed by at least one processor to implement steps of the encryption method according to claim 1.

17. A chip, wherein the chip comprises a processor and a communication interface, the communication interface is coupled to the processor, and the processor is configured to run a program or an instruction, to perform steps in the encryption method according to claim 1.

* * * * *